(12) United States Patent
Collins et al.

(10) Patent No.: US 11,138,475 B2
(45) Date of Patent: Oct. 5, 2021

(54) SYSTEMS AND METHODS FOR DATA PROTECTION

(71) Applicant: JPMorgan Chase Bank, N.A., New York, NY (US)

(72) Inventors: Matthew Jesse Collins, Jersey City, NJ (US); David MacFarlane, Glasgow (GB); Sean Thomas Kornish, Glasgow (GB); Jorge Garcia Reyero, Aubonne (CH); Philip Harvey, Glasgow (GB)

(73) Assignee: JPMORGAN CHASE BANK, N.A., New York ( * ) Notice: Subject to any disclaimer, the term of this patent is extended or adjusted under 35 U.S.C. 154(b) by 117 days.

(21) Appl. No.: 16/290,260

(22) Filed: Mar. 1, 2019

(65) Prior Publication Data

US 2020/0279139 A1 Sep. 3, 2020

(51) Int. Cl.
*G06K 9/00* (2006.01)
*G06K 9/62* (2006.01)
*G06F 16/35* (2019.01)
*G06F 21/60* (2013.01)
*G06F 21/62* (2013.01)
*G06N 5/02* (2006.01)

(52) U.S. Cl.
CPC ......... *G06K 9/6267* (2013.01); *G06F 16/353* (2019.01); *G06F 21/604* (2013.01); *G06F 21/62* (2013.01); *G06N 5/025* (2013.01)

(58) Field of Classification Search
None
See application file for complete search history.

(56) References Cited

U.S. PATENT DOCUMENTS

| 2009/0198697 | A1 | 8/2009 | Bilger et al. |
| 2012/0203705 | A1 | 8/2012 | Van Beneden et al. |
| 2015/0172233 | A1 | 6/2015 | She |
| 2015/0254469 | A1 | 9/2015 | Butler |
| 2018/0027006 | A1* | 1/2018 | Zimmermann ..... H04L 63/0245 726/11 |
| 2020/0210613 | A1* | 7/2020 | Carrier .................. G06F 40/166 |

OTHER PUBLICATIONS

International Search Report, dated Jun. 9, 2020, from corresponding International Application No. PCT/US2020/018556.
Written Opinion of the International Searching Authority, dated Jun. 9, 2020, from corresponding International Application No. PCT/US2020/018556.

* cited by examiner

*Primary Examiner* — Wei Wen Yang
(74) *Attorney, Agent, or Firm* — Greenberg Traurig LLP

(57) ABSTRACT

Systems and methods for data protection are disclosed. In one embodiment, in an information processing apparatus comprising at least one computer processor, a method for providing data protection may include: (1) receiving a plurality of data classification rules; (2) receiving end user data classification from end user software; (3) receiving developer data classification from SDLC software; (4) generating a data inventory; and (5) applying at least one data protection to the data inventory based on the data classification rules, the end user data classification, and the developer data classification.

19 Claims, 5 Drawing Sheets

SYSTEMS AND METHODS FOR DATA PROTECTION

BACKGROUND OF THE INVENTION

1. Field of the Invention

The present disclosure generally relates to systems and methods for data protection.

2. Description of the Related Art

Large organizations receive, process, and store large amounts of data, and this data is subject to constantly changing regulations, threats and technology platforms. To drive consistent data control, data is often classified to enable management at scale (e.g., controlling all "Swiss only" data consistently is far more achievable than individually assessing each document, data element in a database, and email). The volatility of rules, threats, and technologies combined with the amount of data makes manual classification impossible.

SUMMARY OF THE INVENTION

Systems and methods for data protection are disclosed. In one embodiment, in an information processing apparatus comprising at least one computer processor, a method for providing data protection may include: (1) receiving a plurality of data classification rules; (2) receiving end user data classification from end user software; (3) receiving developer data classification from SDLC software; (4) generating a data inventory; and (5) applying at least one data protection to the data inventory based on the data classification rules, the end user data classification, and the developer data classification.

In one embodiment, the data classification rules may be based on at least one of a data use environment, a security context for the data, a subject for the data, and an organizational jurisdiction for the data.

In one embodiment, the data classification rules may be standardized into a single set of classifications.

In one embodiment, the data classification rules may be stored in a rules store.

In one embodiment, the rules to detect an in-scope document may be based on one of a data pattern in the document, an attribute of an author of the document, a source of the data, and a creation environment for the document.

In one embodiment, the method may further include specifying a data lookup criteria, wherein the data lookup criteria specifies a data match to a logical attribute or data subject based on at least one of a data pattern and a data value.

In one embodiment, the method may further include receiving a data description from a developer for the data, wherein the data description describes the data using at least one stable term.

In one embodiment, the end user software may automatically classify unstructured data.

In one embodiment, the end user software may automatically classify unstructured data based a prior classification.

In one embodiment, the method may further include confirming the end user software automatic classification.

In one embodiment, the developer data classification may include a developer classification and a datastore discovery classification.

In one embodiment, the SDLC classification may include an enduser classification and a filestore discovery classification.

In one embodiment, the data inventory may include the end user classification and the SDLC classification for the data.

In one embodiment, the data inventory may include a protection state for the data.

In one embodiment, the data inventory may include a compliance state for the data.

In one embodiment, the data protection that is applied may be a data protection level selected from the group consisting of baseline protection, enhanced protection, and full lifecycle data protection.

In one embodiment, an encryption level is associated with each data protection level.

In one embodiment, the method may further include integrating the applied data protection with a third party.

In one embodiment, the method may further include defining a plurality of rules to detect an in-scope document.

In one embodiment, the data protection may specify who can access the data, where the data may be stored, transmitted, or transacted, a maximum and minimum data retention period, and/or technical controls placed on the data.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
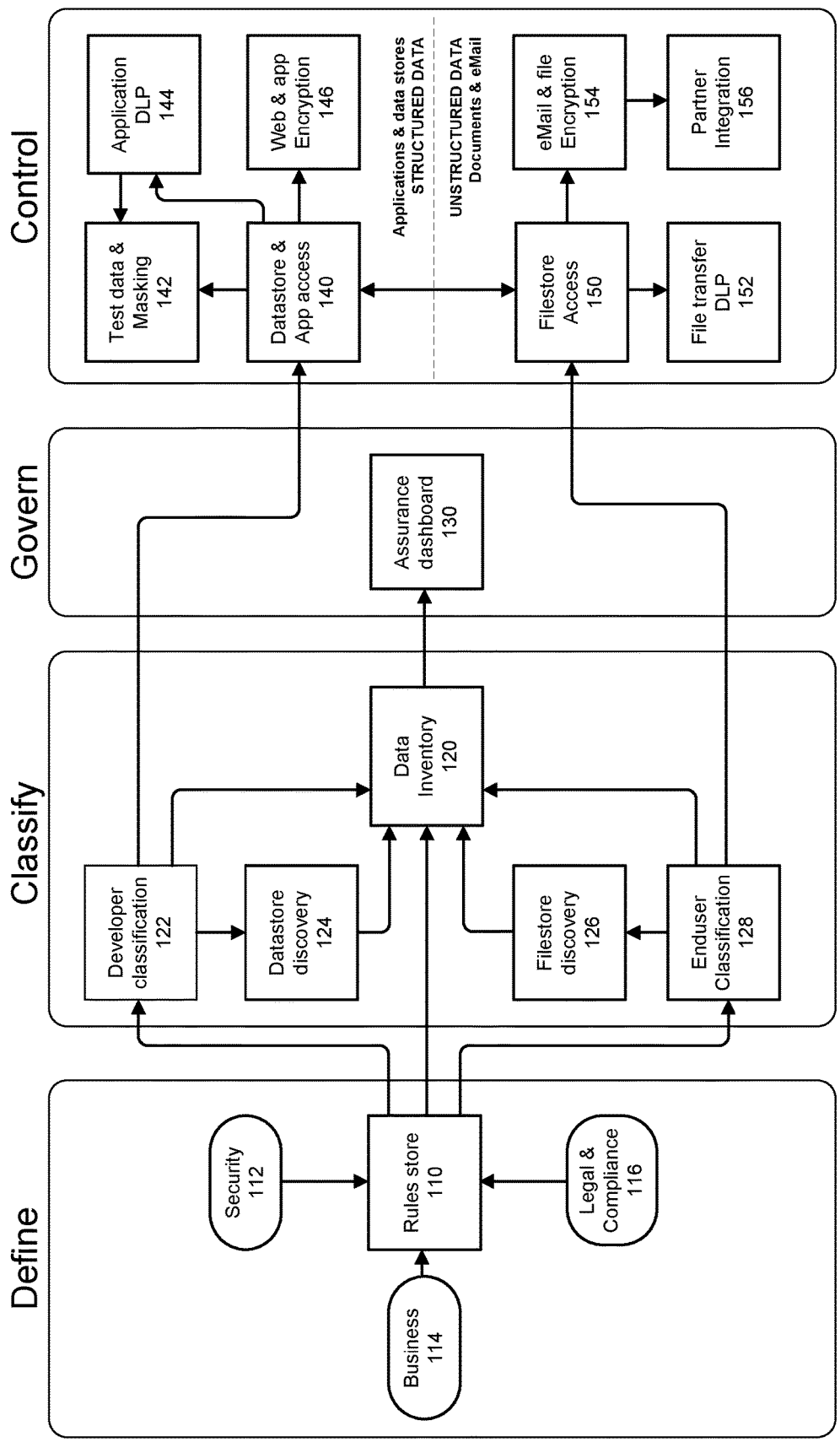
FIG. 1 depicts a system for full lifecycle data protection according to one embodiment.

Embodiments disclosed herein related to systems and methods for data protection, including full lifecycle data protection ("FLDP").

In embodiments, sensitive data may be encrypted end-to-end, not just at rest or in transit, and decryption may be permitted only when there is proof that an authorized user in a permitted environment is present. Thus, embodiments may prevent decryption in high-risk and region-restricted locations, may restrict certain data to safe "on premise" environments, and may control who can see it in the cloud and at the endpoints.

Embodiments may separate rule management from the data description.

Embodiments may use standardized definition(s) of which data classifications matter to an organization's compliance, legal, security, business policy, and other teams. This may facilitate the scaling to the number of requirements and the rate of change. For example, "Swiss restricted" data may have specific control requirements for access, storage, and transmission controls that cannot be expressed in a general requirement like "confidential."

Embodiments may include data descriptions that may be created by data creators, such as application developers and users handling and creating sensitive documents and email. The data may be defined, for example, in stable terms, such as names, addresses, document types, client or employee information, etc., and not how the data is classified. Thus, the required human workload may be done once per data set rather than once per rule, technology or threat change.

In embodiments, classification rules may be applied, using software, to data based on its description. For example, during the software development life cycle ("SDLC"), application developers may label the data schema with descriptions prior to user acceptance testing ("UAT"). And, during document creation, users may be prompted with descriptions determined by commercial labeling software.

In embodiments, control enforcement tools, such as data loss prevention ("DLP"), access control, encryption, logging, storage and transmission decisions, etc., may use protection rules to control the data based on classification, regardless of where the data was originally authored or sourced from.

Embodiments further may reduce the overall workload, as data may be described once, and the description may remain valid for the lifetime of the data set. Similarly, classification and protection rules may be defined once, and may be altered without re-describing the entire data set.

In addition, embodiments may provide a lesser impact from over-control by tying data handling, protection, storage, retention, deletion and transmission decisions to business and regulation specific classification terms. For example, data loss prevention and other controls may understand what data is permitted where, and crude "may not leave the organization" rules may be replaced with more accurate "may be shared with" rules, based on the specified business or compliance requirements.

Referring to FIG. 1, a system for full lifecycle data protection is provided according to one embodiment. System 100 may include four components or stages: a data definition component, a data classification component, a data governance component, and a data control component.

The data definition component may define the rules for data protection based on the rules and/or requirements. For example, the definition of what data matters to, for example, the compliance, legal, security, and business policy teams, and what the specific control requirements are for access, storage, and transmission, may be standardized.

In one embodiment, the inputs may supplement, or entirely replace, the use of simple four or five-term classification schemes that cannot capture the granularity imposed by the increasing scope of regulation, contract, and business policy, such as GDPR, PCI-DSS, HIPAA, etc.

Rules store 110 may receive inputs from teams or units within an organization, such as security team(s) 112, business team(s) 114, and legal/compliance team(s) 116. These teams are exemplary only, and it should be recognized that other teams may provide inputs to rules store 110.

The rules defined in rules store 110 may be applied to classify and control data the same way regardless of the platform or user environment. In one embodiment, the data classification rules may be defined independently of where and how data is stored and/or presented.

Data classification rules may include some or all of the following elements: data environment (e.g., storage, processing, transmission, etc.) such as the jurisdiction of the data center, the security context of the data (e.g., Internet-facing, within a DMZ, or isolated on a secure LAN), the team or unit operating the systems; data subject (e.g., what the data is about, such as clients, transactions, servers, assets, etc.), and the organizational or jurisdictional relationships of those concepts (e.g., German employees, Japanese transactions, investment banking clients); and logical attributes (e.g., what the data contains).

In one embodiment, the data classification rules may be standardized into a single set of classifications (e.g., desktop/application, multi-product, etc.), and may tie the classification to a single set of data handling rules (e.g., access, storage, transmission, retention/deletion, protection, etc.).

In the case of documents being created ad hoc by users in office productivity software, such information may not be available. Thus, additional elements, which may be less accurate than those identified above, may be used. For example, patterns and value lookups (e.g., what the data contains) that enable a close match to logical attribute and data subject may be used without requiring a human to describe the data first. The data author and the data source may also be used as proxies for more precise information around data subject, organizational and jurisdictional relationships.

In one embodiment, data classification rules may be authored as part of routine business practices, and integrated into those practices over time as the enterprise matures the rule authoring approach. Data classification rule authoring may involve a service team engaging with other teams, understanding their requirements, and establishing the rules for them. Self-service interfaces that integrate with each team's existing business workflows may be used, while still contributing the rules to a common repository using a common structure.

Data classification rules may be organized as policies, reflecting a source of authority, e.g., a particular contract, regulation, business activity, or threat. For example, a policy set may encompass an organization's policies, and a policy may represent a set of classification and handling rules for a given set of authoritative requirements, such as a particular regulation, law, business approval, etc. One policy set may include one or more policies, and one policy may be included in one or more policy sets. The policies may be stored in rule store 110.

In one embodiment, policies may be versioned to permit assessment of the impact of change, and they have explicit owners responsible for maintaining them. Policies may be definable as relevant to particular business activities or technology environments when not of enterprise-wide relevance. Further, policies may be defined by the business units and teams that are authoritative for the topic a policy supports. Any part of the enterprise may be able to consume a policy, and units or teams have confidence their policies are enforced with integrity and cannot be altered by groups outside their jurisdiction.

Each policy may include one or more rules defining data that is relevant to some of its requirements. An example of a rule is "Swiss Client Identifying Data." These rules are authorable in terms comprehensible to the policy author, and are able to subsequently support automated identification of data that matches the rule. Rule authors may create rules with close alignment to the source requirements they observe. An illustrative example is data relating to customers processed within Europe counts as GDPR regulated.

The data classification component may include data inventory 120, which may receive data from developer classification 122, datastore discovery 124, filestore discovery 126, end user classification 128, and other data identification and classification systems. This enables automatic calculation of the sensitivity, even as the rules change, without further human involvement, and regardless of whether the initial data description is provided by security technologies or other business processes and platforms.

For example, using developer classification 122, developers may describe what their data is in stable terms (e.g., in a financial institution environment, mortgage or private bank documents, client or employee information, etc.) and not in terms of sensitivity (e.g., "secret," "public," etc.).

In one embodiment, during the SDLC, application developers may label, tag, or otherwise associate their data schema with descriptions. This may be done prior to user acceptance testing ("UAT"). During document creation, desktop users may be prompted with descriptions determined by commercial labeling software.

Developers creating code may also be asked these questions during the creation process, within the software IDE, or via the integration and build processes.

In one embodiment, developers may annotate structured data during the SDLC to provide data descriptions using tooling designed to enrich the interactive development environment through auto-completion, and checks in continuous integration to determine if new data has been added without descriptive annotations as a backstop to more comprehensive enterprise-wide metadata programs. The data classification rules may be evaluated against enterprise metadata and the data descriptions provided by the developer at application build time to determine if any rules apply to the application's data. Where such matches are found, three manifest files may be generated as part of the build process: a data description manifest informing the developer of all metadata relevant to the application and where it was sourced from, permitting correction if incorrect; a data classification manifest informing the developer of classifications determined from the metadata, the classification policies that determined those results, and the policy owners, should the developer wish to dispute the results; and a data control manifest informing the developer of their obligations as a result of the classifications, letting the development team determine resourcing if the obligations are to be met or removal of the data if they are considered prohibitive. A similar approach may be used when onboarding existing data to new data stores.

Datastore discovery 124 may provide automated scanning of data at rest that may be used to identify data to prioritize for onboarding to classification services through simple machine lead analysis such as pattern scanning or data attribute names, or to find additional instances of already well understood data through fingerprints that assess the data content, structure, usage logs, access rules and physical data stores for similarity, and which may use machine learning or procedural rules to construct these fingerprints. In one embodiment, these fingerprinting and scanning services may be distributed through the environment using small workloads such as agents or containers, to achieve performance at scale and avoid the security and compliance impacts of centralized scanning services.

For small samples, human engagement may provide greater accuracy than fully automated classification, which may be de-emphasized in favor of higher accuracy (e.g., while establishing new classification processes and rules). Machine learning may then be used to scale that human-driven classification across the bulk of the existing data estate.

End user classification 128 may infer properties of unstructured data (e.g., office documents and emails) through automated inspection at the point of creation, and this may be validated by asking users questions about the data they work with or prompting them with classification results. Prompted classification may be minimized by partially or fully automating classification, where possible, and creating training material for machine learning where not. Metadata used during initial classification (e.g., data author, environment, subject, etc.) may be preserved so reclassification may be executed programmatically when rules change.

Filestore discovery 126 may provide automated scanning of files and may be used to classify the files. This may be similar to the automated scanning of data at rest, discussed above.

The classification(s) from developer classification module 122, datastore discovery module 124, filestore discovery module 126, and enduser classification module 128 may be provided to data inventory 120.

Data inventory 120 may compute and provide a detailed view of the data classification by comparing the data protection rules to the metadata from end users, developers, and discovery service that describe the data.

Once data is understood and a classification is determined using the classification rule(s), the obligations the policy imposes on its handling may be determined. Examples include: who can access the data; where the data may be stored, transmitted, or transacted; what are the maximum and minimum periods the data must be retained for; and what technical controls must be in place on the data. A policy can require, permit, and/or prohibit certain outcomes.

The data handling rules may be used to inform developers during build that their code must support these capabilities; to enforce access and transmission decisions at runtime in IAM and DLP services; to detect runtime breaches of the rules through correlation with logs; and to provide compliance reporting around the state of data identified during classification and discovery processes.

The data governance component may include assurance dashboard 130, which may interface with data inventory 120. Assurance dashboard 130 may monitor and report data protection measures. For example, a central inventory may be created that describes the data in the terms used by data rules and classification services to permit continual evaluation of access, storage location, protection measures, and retention periods against currently defined data rule sets. Tools may be provisioned to correct data found out of compliance by applying additional protections, masking or otherwise replacing sensitive elements, and by destroying or cryptographically shredding data when no longer required.

The data control component may include datastore and application platform controls (e.g., access management, logging) 140 and filestore access 150. In one embodiment, datastore and application controls 140 may be configured based on classification data from developer classification 122, and may include platform integration with application DLP 144, data redaction and masking 142, and web and application encryption 146.

Control services for datastores, applications and other data platforms include 140, test data generation and data masking 142, application Data Loss Prevention 144, and web and application encryption 146 for use during data storage, transmission, and processing for structured and semi-structured data.

Unstructured file platforms orchestrate consistent controls for filestore access rules 150 and interface with file transfer Data Loss Prevention 152, and email and file encryption 154. Email and file encryption 154 may interface with partner integration services 156 where files leave the organization.

Filestore access 150, file transfer DLP 152, email and file encryption 154, and partner integration 156 may store, transmit, and process unstructured data, such as documents and emails.

Datastore and application access, test data and masking 142, application DLP 144, web and application encryption 146, filestore access 150, file transfer DLP 152, email and file encryption 154, and partner integration 156 may be part of the control component of system 100. The control component may control the protection measures for both structured and unstructured data so those measures comply with the rules and the data classifications. Protection measures may include controlling data access, transmission, and storage; understanding data usage; responding to changes, etc.

In one embodiment, the control component may define data controls, with the goal(s) of controlling who can access the data, controlling where the data is exposed, controlling how long the data is kept for, and/or controlling which data protection methods are used. Encryption may be used to prevent access to the data by any mechanism that does not enforce the objectives. Secure Enclaves may be used to ensure the encryption keys cannot be accessed by administrators, bypassing the enforcement points. Embodiments may provide consistent measurement, enforcement, and monitoring of the data through its lifecycle.

In one embodiment, control enforcement tools may use protection rules to control the data based on classification, regardless of where the data was originally authored or sourced from. Control solutions may provide "data-centric" full lifecycle data protection, as well as lighter-weight baseline and enhanced "system-centric" protections. Control services may be built in to enforce the rules without rebuilding the app each time the rules change.

Control component may implement sets, or tiers, of data access controls, such as baseline controls, enhanced controls, and FLDP controls. In one embodiment, each of the sets/tiers of controls may represent differing levels of protection that may be applied where required by the rules, which each level providing increased protection against certain attack methodologies, but the increased protection may also prevents certain legitimate activities.

Baseline controls are highly efficient and simple-to-deploy, and are designed to meet common compliance requirements and protect against hygiene threats without requiring significant rebuild and refactoring of systems. Baseline controls provide a way to rapidly achieve coverage at scale. They are not fully effective against sophisticated attacks because they take a simple "known bad" blacklist approach.

Enhanced controls are an extension and improvement of the baseline controls and are designed to increase effectiveness while introducing higher operational overhead and cost for data determined to require higher protection. The enhanced controls take a whitelist approach, which requires careful tailoring of controls and configurations specific to each application and environment, thus making it difficult to scale and more disruptive than the baseline controls.

FLDP controls may provide end-to-end protection of the data in a fashion credibly able to protect against administrators, breaches of applications, and compromises of authorized end users. FLDP may be used with high-risk systems that send data across a variety of complex environments. FLDP may supplement the baseline and enhanced controls by adding encryption to only the most sensitive data elements.

FLDP controls may require description and scanning of all the data, but allow great precision and rapid response to changing data and regulatory requirements by automating much of the calculation and application of classification and control requirements.

In embodiments, some or all of the following controls may be a core part of the baseline, enhanced, and FLDP control sets: transparent resource encryption, perimeter controls (e.g., network filtering), security monitoring, data loss prevention, test data generation, data purging, patching, application code development practices, and data backup and retention testing.

In embodiments, the sets of controls may support some or all of the same types of capabilities and services. For access control, they may restrict who has access to the data based on both application and enterprise-wide rules, and enforce those rules with a combination of encryption, rate limiting (restricting how much data a user or service may consume in a given window), and secure enclaves protected from the administrator.

For transmission and storage control, the sets of controls may extend the rules to control what data may be transmitted where and to whom by, for example, keeping certain data on premises or in the client environment, restricting some data to particular jurisdictions, and preventing sensitive data from being written to lower control environments such as development platforms.

For data retention and deletion, the sets of controls may enable automated archiving of sensitive data for the required period, and use encryption to "digitally shred" the data even when the chain of custody has taken it out of the technology environment.

The sets/tiers of controls may also enforce logging, multifactor authentication, and region-compliant encryption where required by regulation or policy.

In embodiments, the sets/tiers of controls may integrate with other services, such as data management, encryption and key management, identity and access management, cloud technologies, and asset lifecycle management.

It should be noted that these sets/tiers of control are exemplary only and a greater or fewer number of sets or tiers of controls, and/or types of tiers or controls, may be used as is necessary and/or desired. For example, the number of sets/tiers of controls may be based on the risk associated with the data.

Once the number of sets/tiers of controls are determined, and external services (e.g., ETL to generate test data, network DLP to intercept and control distribution of classified data, etc.) are present, the required integrations may be built into the platforms (e.g., automated jobs to scan for classified data and replace with test data; certificates permitting network interception and decryption of encrypted data for DLP; endpoint DLP agents). Thus, the services may be integrated at build time, and may be automatically configured based on the data profile in the inventory, rather than being continual overhead requiring human assessment and control layering on top of the platform, with any necessary reconfiguration as data and data requirements change.

As a result, the data rules gathering may be used to impose high bar controls only where there is a clear compliance or risk based driver requiring it, leaving the business maximum flexibility and value from their data when possible. The sets/tiers of controls may be coarse grained, defining how much work is needed to understand the data. Baseline controls take a broad brush approach providing a reasonable basic level of protection.

In one embodiment, six levels of data encryption may be used. In one embodiment, the most basic controls are provided at level 1, and the most robust, but highly disruptive, controls are at level 6. Any suitable number of tiers may be used as is necessary and/or desired.

In one embodiment, the levels of control (e.g., baseline, enhanced, FLDP) may define controls trading off effectiveness versus cost at an abstract level, and may encompass a variety of different controls across a variety of platforms, access control, encryption, logging, etc.

The levels of encryption may be very specific to one control, but may follow the basic construct—at lower levels, the encryption is less disruptive to implement, but also mitigates fewer threats. At higher levels, the encryption becomes more effective, but is also more disruptive.

For example, the baseline control level may use encryption levels 1 and 2, and may have low difficulty to implement, but a low level security strength. The enhanced control level may use encryption level 3, and may have a moderate difficulty to implement, and a moderate level of security strength. The FLDP level may use encryption levels 4, 5, and 6, and may have a very high difficulty to implement, and a very high level of security strength.

Level 1 is Shared Resource Protected Transparent Encryption. In this level, encryption may be managed entirely in the infrastructure environment (e.g., database, cloud service). The enterprise cannot guarantee control over the encryption or key management. Level 1 corresponds to the baseline controls.

Level 2 is Shared Resource Protected Key Management Service (KMS) Encryption. In this level, encryption is managed in the untrusted or semi-trusted environment, but keys are managed in a separate semi-trusted provider-owned KMS. The release of the keys to the service is tied to the trusted enterprise's IAM role. Level 2 corresponds to the enhanced controls.

Level 3 is In App Protected Application Level Encryption (ALE) or FLDP. In this level, encryption is managed in the trusted application, though running in the untrusted environment. Keys that may be managed by enterprise-owned KMS, and release of the keys is tied to enterprise-owned IAM/entitlements. Data is protected from compromise by other consumers at the shared resource layer—filesystem or database—by using keys specific and authorized to the application, but used in app memory. Level 3 corresponds to the FLDP controls.

Level 4 is Administrator Protected ALE or FLDP. In this level, encryption and decryption occur in a trusted proxy hosted in the untrusted environment (customer-controlled cloud-hosted HSM, SGX enclave, etc.) or a separate third-party environment operating under different regulatory and threat conditions. All key usage may occur in a protected enclave so administrators and application accounts cannot gain direct access to the keys protecting data at rest. Level 4 may corresponds to the FLDP controls.

Level 5 is Administrator Secure ALE or FLDP. In this level, encryption, decryption, and key management are on premises or on a trusted endpoint. Encrypted data cannot be processed in untrusted or semi-trusted environments. Keys are only used on fully trusted endpoints. Level 5 corresponds to the FLDP controls.

Level 6 is Sovereign Secure Tokenization. In this level, tokenization or masking occurs on premise or on a trusted endpoint. Token vault usage removes any risk of a cryptographic algorithm breach because there is no such algorithm to break. There is no exposure of data in the cloud.

Levels 3, 4, and 5 may each support the use of ALE or FLDP. With encryption implemented application by application (ALE), data is decrypted when it leaves the application environment, exposing it to administrators and application accounts in usage and at every network transmission. With FLDP, where the same keys and cipher text formats permit passing the data from hop to hop, the data is exposed only where an authorized user and service are present and operating in an authorized environment, and never in large volumes.

Figure 2:
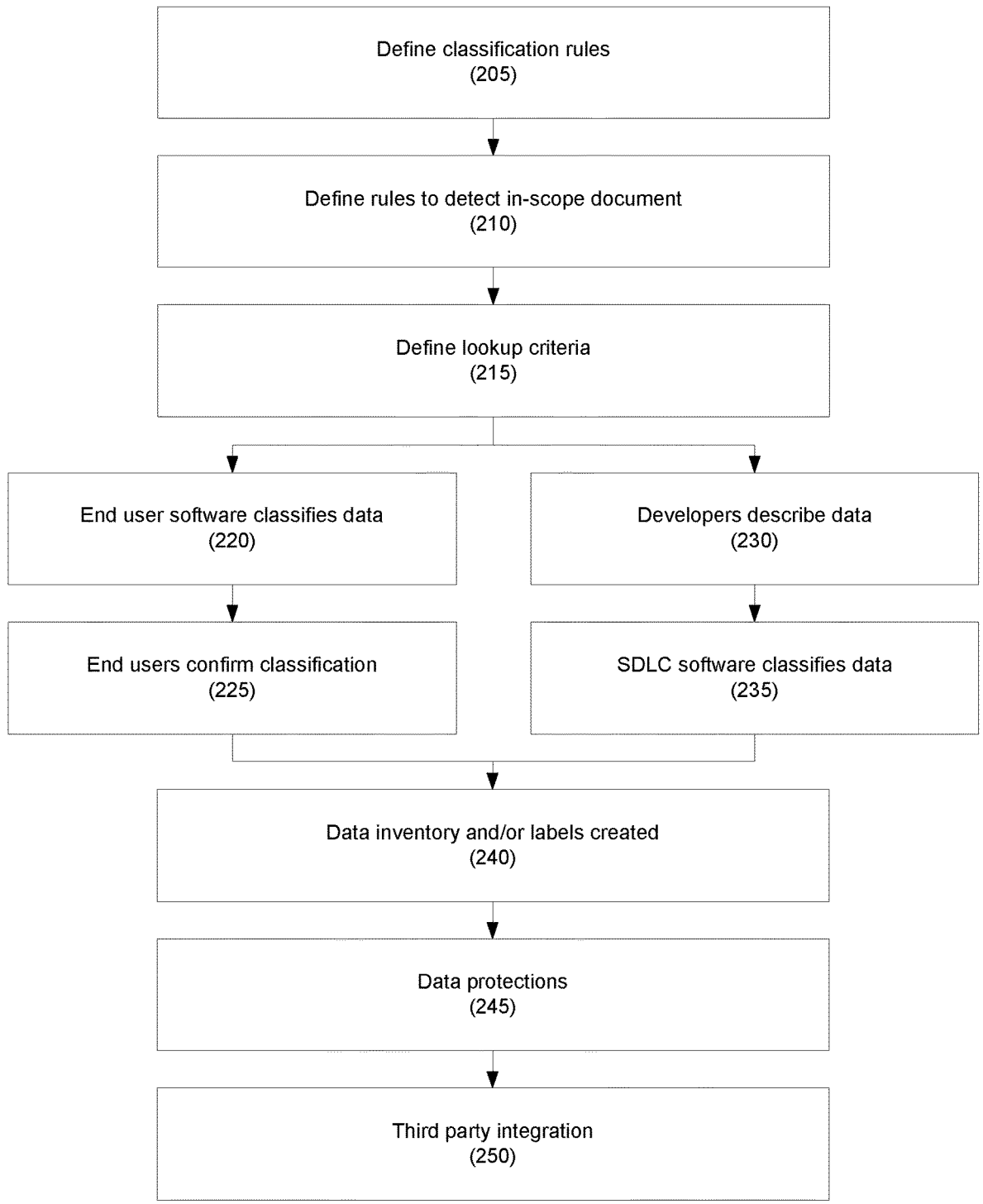
FIG. 2 depicts a method for data classification according to one embodiment.

Referring to FIG. 2, an exemplary method for data rule definition is provided according to one embodiment. In step 205, data definitions and data classification rules may be received. In one embodiment, teams, such as security, business, legal and compliance, etc. may provide inputs to a rules store in order to define what data matters and how it is to be handled. For example, the classification rules for the business unit in question may be defined, based on, for example, the kinds of data they use, expect to receive, etc. In one embodiment, the classification rules may be in natural business terms, and not based on control categories.

In step 210, rules to detect when a data (e.g., a document, an email, database content, an application object, etc.) may be in scope for one of the terms in the taxonomy may be defined. In one embodiment, this may be based on data patterns in the content, attributes of the author, source of the data, environment the data is created in, etc.

In step 215, lookup criteria to gain further assurance that the data may in fact be for that term may be defined. For example, where simple patterns are matched, such as a credit card structure, this criteria may provide the ability to perform a subsequent "exact value" check to validate the relationship of the credit card to the business. The use of lookup criteria is in contrast to pattern matching, which alone is high-noise, low-value, unable to distinguish test data from live data, and low risk business data from high risk information.

Multiple approaches to apply these classification rules to data may exist, designed to work efficiently in specific business workflow and technologies. For example, steps 225 and 220 are used in a typical end user environment producing documents, eMails and spreadsheets. Step 230 and 235 are used in a typical software development environment producing source code, database schema and other software artifacts.

In step 225, end user software may classify the data. In one embodiment, the end users may be provided with automated classification of unstructured data (e.g., documents, emails, etc.). This may be done on-premises, in the cloud, etc.

In one embodiment, machine learning may be used in the end user data classification process.

In one embodiment, the classification may be confirmed. In one embodiment, rules may require classification or simply prompt for it, and may prevent reclassification for all but authorized users if required. For high-confidence matches, the mapping of the classification into the document may be automated. For lower-confidence matches, the user may be prompted for confirmation, and either the confirmed classification or a confirmation that it is not that kind of data, accountable to the user, may be stored in the data inventory, and/or embedded in the document as a visible watermark and/or user-invisible metadata.

In step 230, the developers may describe the data. In one embodiment, developers may be provided with automated notification of data classification and/or control obligations during the build process. The classification may leverage rules, metadata, etc.

In one embodiment, machine learning may be used in the developer data classification process.

In step 235, SDLC software may classify the data. For example developer classification 122 may classify the data as described above.

For software development team classification (e.g., steps 230 and 235), the following exemplary implementation details are provided.

When integrated into the software development pipeline this provides a flexible labeling of data that permits any line of business or controls team to assert a new requirement along these lines, and have the impact on existing data sets automatically evaluated by comparing these rules to the metadata supplied during build—the logical attribute (category of data, such as name, address, phone number, SSN, etc.), subject domain (the type of entity the data refers to, such as client, employee, competitor, vendor, server, stock, portfolio, etc.), subject organization (e.g., the name or type of organization), and subject jurisdiction (e.g., the location, provider or consumer legal or organizational scope of the data) may be used.

As applications are developed, developers requiring data protection decisions may annotate data in their Data Definition Language (e.g., database setup code), if not using the organization's logical data model driven approach.

Any new columns added to the store may be annotated with the logical attribute.

Tables, schema or entire data stores may be annotated with the subject type, subject organization and subject jurisdiction.

Any new tables added to the store may be annotated with the subject type, subject organization and subject jurisdiction describing its content, or fully modeled in the MDR.

Where subject jurisdiction and organization may differ by deployment target (e.g., Mosaic NA vs Mosaic APAC) the annotations may be scoped to an application instance, to be supplied at deploy time.

Where a developer does not know the eventual target deployment jurisdictions, defaults may be inferred from the organization entity associated with the application in an application directory, with subsequent narrowing down if the classifications determined are deemed too expansive.

In embodiments, when pushed to Continuous Integration/Continuous Build (CI/CB), the application's associated structured stores may be scanned to retrieve physical model details (e.g., schema, database, table, column, constraints).

The classification engine may query the MDR to identify any existing descriptions of the physical model's content.

The classification system may determine the authoritative description of the data store by using MDR definitions if available, or, where MDR definitions are unavailable, looking for developer-provided annotations in the physical content. Where annotations are unavailable, it may provide a build time error requiring annotations to be provided via the Classification GUI.

Where the discovered physical model differs from MDR content, it may provide a build time error requiring the MDR representation and physical annotations to be synchronized.

Where the discovered model and annotations are present for content not present in the MDR, an update may be pushed to the MDR to update it.

The reconciled physical model description—MDR+Annotations+GUI input—may be cached in a manifest to be shipped with the application.

The net output of this should be that a developer may rely on an organization's MDR terms already available being used, or provide lightweight annotations during development and be informed rapidly of the consequences of any change to the data in the platform, enabling identification of encryption, access, logging and storage obligations during the design and development stage when such measures may be feasibly integrated, rather than during app release, or many years afterwards, where controls that require change to the app data handling approach are expensive or impossible to retrofit.

During build, current rules may be matched against the classification manifest to determine if any current rules apply to the application's data set. Where they do, a control manifest may be generated (e.g., an XML or JSON output) to be shipped with the app, specifying which controls are required in which deployment locations.

In one embodiment, the data protection framework may query the environment attributes in organizational asset inventories for data sources the first time they are connected to, and will then cache them in the storage manifest. An external job will periodically synchronize the manifest against the inventories to ensure details remain current.

For example, where classification is Swiss CID and requestor jurisdiction is not Swiss, the request may be prohibited.

In step 240, a data inventory may be created, including both end user and developer metadata and classifications. In one embodiment, the data inventory may include detailed protection and compliance state provided by unifying the data protection rules, metadata inventory on what data is and classifications from end users and developers.

In one embodiment, the original data source, author, description, pattern matches, and environment attributes ("metadata") may be similarly embedded for future automated reclassification purposes.

In one embodiment, the classification event and data location may be captured for future training of machine learning solutions, once available.

In step 245, protections may be provided to the data. For example, full Lifecycle data protection may be provided for applications, documents, etc. to protect sensitive information from administrators, application flaws and abuse by authorized users, on-premises and in the cloud.

In one embodiment, the data protections may be integrated with third parties.

Figure 3:
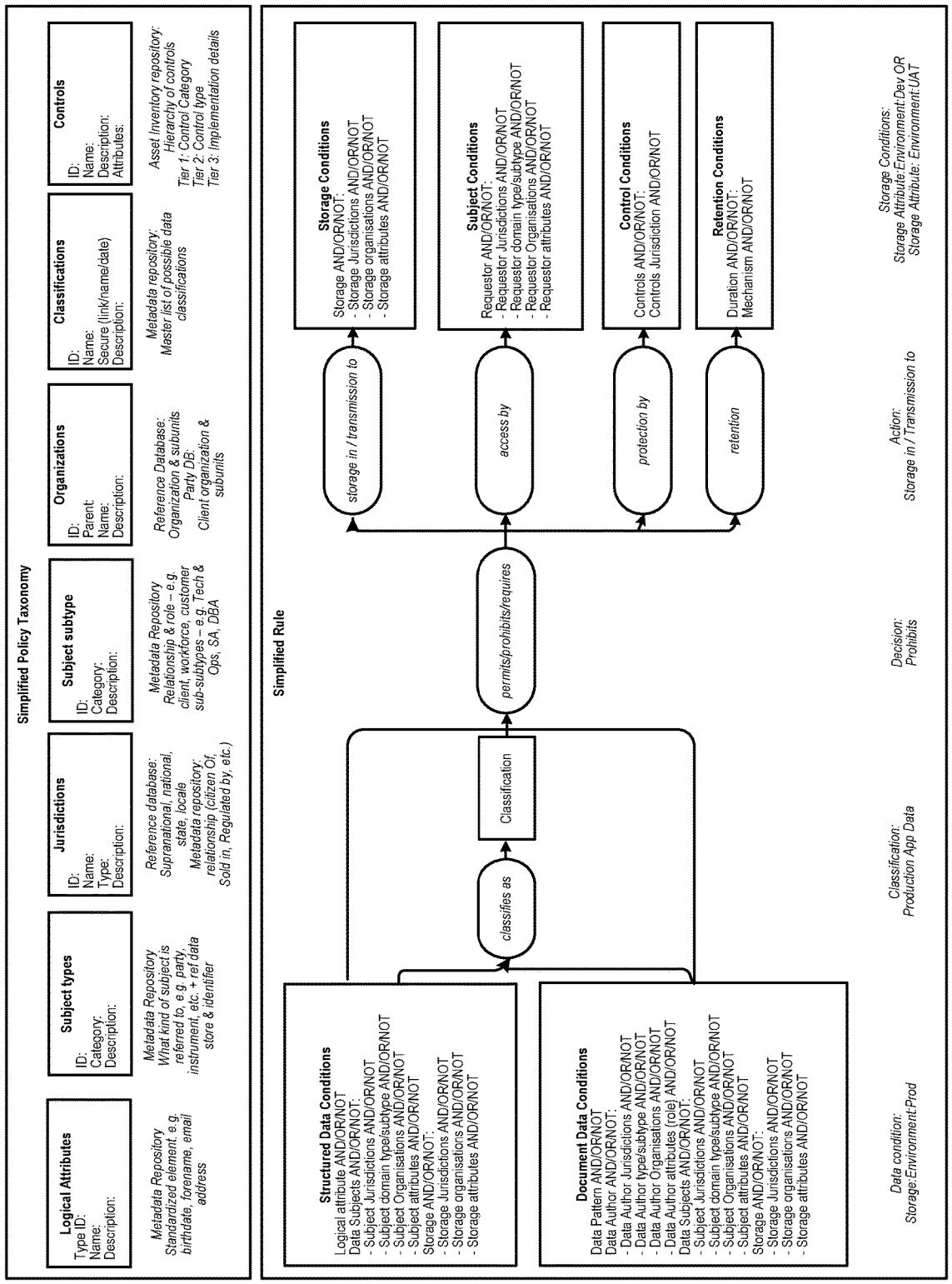
FIG. 3 depicts an exemplary policy structure that may be used for rule authoring according to one embodiment.

Referring to FIG. 3, an exemplary policy structure that may be used for rule authoring (e.g., steps 205, 210, and 215) is provided according to one embodiment. For example, policy statements may have one or more types, with all data enumerated by the proposed interfaces and stored in the metadata repository (MDR) may be able to support at least these categories:

Access Control rules (e.g., Swiss Client data must not be accessed by non-Swiss staff);

Storage and Transmission rules (e.g., Korean application data must be stored within the geographical confines of South Korea); and Protection rules (e.g., Production PI data must be encrypted in production environments);

Rules may be combined to meet the entirety of a requirement in a policy. For example, the rule on PI encryption may also include a rule requiring that production PI data not be stored in non-production environments.

In one embodiment, data may be classified against a set of classification rules supplied by, for example, the technology controls office, that may incorporate the exemplary Data Protection Rules summarized below:

Where classification is Swiss CID (client identifying information), require control encrypted;

Where classification is Swiss CID and storage location is not Switzerland, Production require control masked;

Encryption rules may optionally require both a specific cipher—e.g., AES-256—or key storage profile.

In embodiments, the Common Classification system may be shared between Full Lifecycle Data Protection (FLDP), Data Loss Prevention (DLP/AppDLP), Masking (ETL) and Data Visibility/Access Control systems to consistently control access to our data at various points in the technology ecosystem, protecting data at rest and in use from unauthorized users and administrative staff, and destroying (mask, redact) data transiting from a permitted location to a prohibited control context (out of country, lower security zone, etc.).

Exemplary implementation approaches for end users are described below.

In embodiments, the end user may be provided with a desktop implementation that may minimize requirements for the end user to understand the organization's control requirements, while still providing sufficient information to determine which controls are relevant to the data. Examples of such tools include classification tool bars (e.g., tools that present the end user with a static set of buttons to select a document type from. The end user must understand how they apply to the document and care enough to engage in clicking them proactively); document context classifiers (e.g., tools that may combine the tool bar with analytics on the document content, the user working with the document, and in some cases additional information such as the source of the data, software being used, desktop in use, etc.); endpoint control solutions (e.g., tools that use on-desktop agents to enforce some basic access and transmission controls based on the labels applied to documents, and offer the ability to apply rights management solutions to further protect the data as it leaves the environment); and document scanners (e.g., tools that can search data at rest, in bulk, for keywords and patterns, and may perform lookups against external databases, directory services and usage logs to try and infer the classification of the document).

Figure 4:
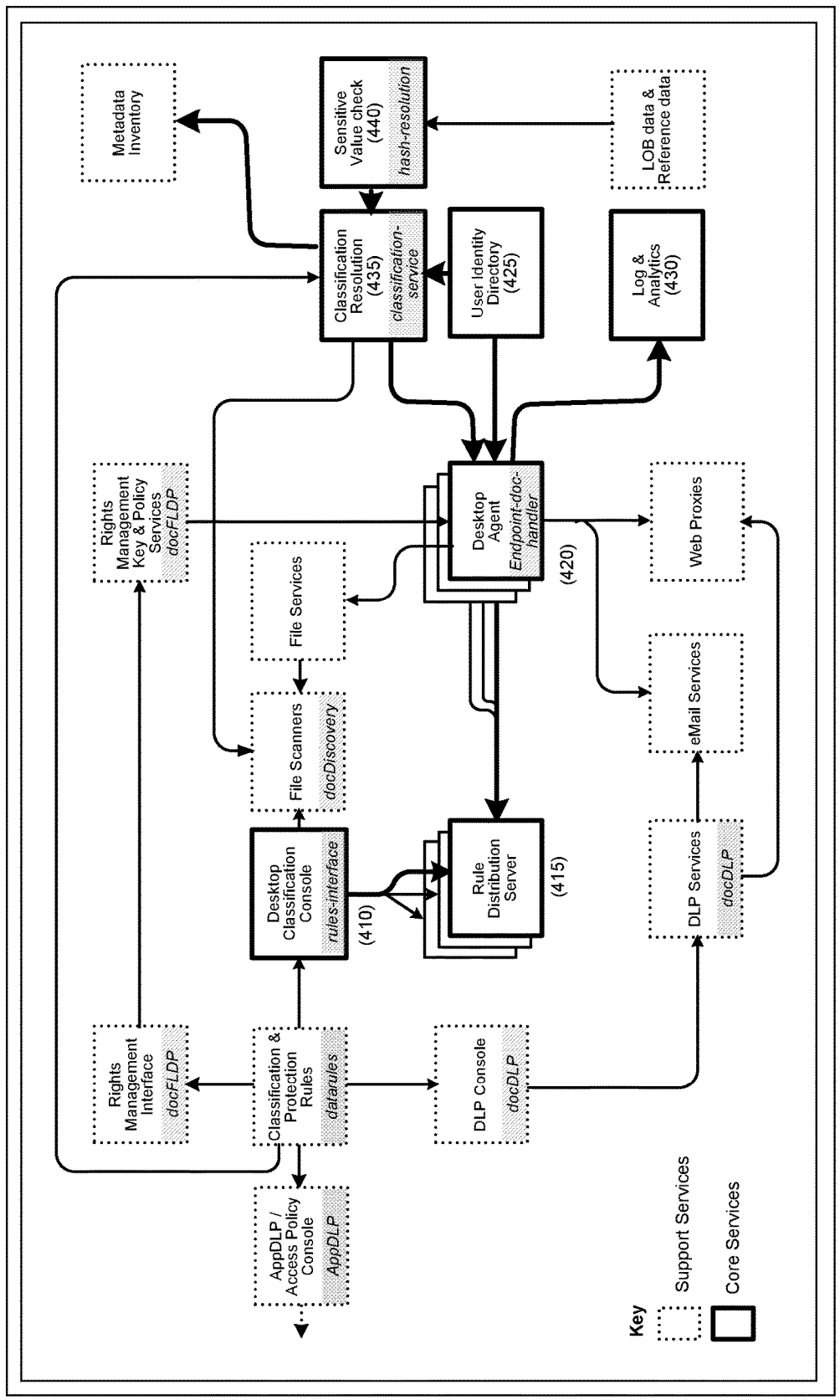
FIG. 4 depicts an exemplary architecture according to one embodiment.

Referring to FIG. 4, an exemplary architecture is disclosed. In one embodiment, architecture 400 may include desktop classification console(s) 410, which may provide authoritative point(s) to view, manage, approve, the application of previously defined data protection rules for a portion of the organization. There may be multiple taxonomies and consoles used for different user communities. Each taxonomy can be paired with rules to automate application.

Rules distribution server(s) 415 may receive copies of the latest generated policy set from the console(s). This may be provided in an XML or JSON file, and may be made available by HTTP or file sharing protocols (SMB/CIFS). Servers 415 may provide a read-only repository, and may have access control lists restricting the policy to particular desktop systems if the policy itself embeds sensitive information (e.g., specific project keywords or client names).

Desktop agent 420 may periodically poll the rule distribution server 415 to which it is registered to for updates, may download the ruleset, may validate the signature on the rules as being from a known console, and then may load and enforce the rules.

Desktop agent 420 may enforce the rules locally by intercepting events (e.g., document open, email send, document save, file move, etc.) by offering the ability to classify some file types through right click on desktop, and through plugins to applications (e.g., Outlook and other Microsoft Office applications) to intercept the creation of new content and offer classification buttons based on the properties in the data rules (e.g., user Active Directory attributes, environment details, etc.). When a match is hit, some tools may support making further lookups against directory services or data stores to validate the pattern as an actual match. This provides a further security tollgate, where sensitive data elements (e.g., email addresses, valid credit card numbers, etc.) may be externalized from the widely distributed policy file to a lookup service restricted to certain agents, or potentially providing only a validation of match and not full query of possible values.

Desktop agent 420 may also deny opening files and transmitting emails based on rules, or require and automate the application of digital rights management platforms to protect the data.

User Identity Directory 425 may provide identities for registered users. All products evaluated may assume that the organization's directory is a source of information about the users interacting with the system, but may not be the only one. This may require alternate stores for certain attributes, or tight coordination for organization elements for data that is not maintained in the directory to be added. A distributed alternate store approach has far greater scalability if many organization elements groups end up requiring further information—e.g., certifications, licenses of individuals, roles, etc.

Log and Analytics module 430 may be provided. For example, the agents may produce and transmit logs to aggregation stores to enable analytics on classification and security events, identifying false positives, high friction for users, potential security breaches, etc.

Classification Resolution service 435 may provide a standardized interface for runtime lookups for sensitive values. Where a data protection rule requires more reference data than can be reasonably distributed in a simple JSON policy, or must be retained in highly secure services the resolution API provides a standard way for agents to request a classification result to display to the user.

Desktop agent 420 may pass all determined metadata and event information to the resolution service, including patterns, user attributes, environment attributes, possible classifications, etc.

Service 435 may use the classification rules approved in console 410 to determine whether a fully automated classification can be returned to the agent for application to the data, or whether a range of choices should be returned to display to the user.

Service 435 may also use the Sensitive Value check service 440 to determine if possibly sensitive data values matching patterns (e.g., for social security numbers, phone numbers, email addresses, etc.) are actually known instances of particular businesses data (e.g., cardholder information).

Sensitive value check service 440 may provide a distributed means for businesses to push dictionaries of hashed values to be checked by classification resolution service 435, while retaining control in a business controlled store that only vends confirmation of sensitivity without exposing actual data values (hash to hash comparison).

Figure 5:
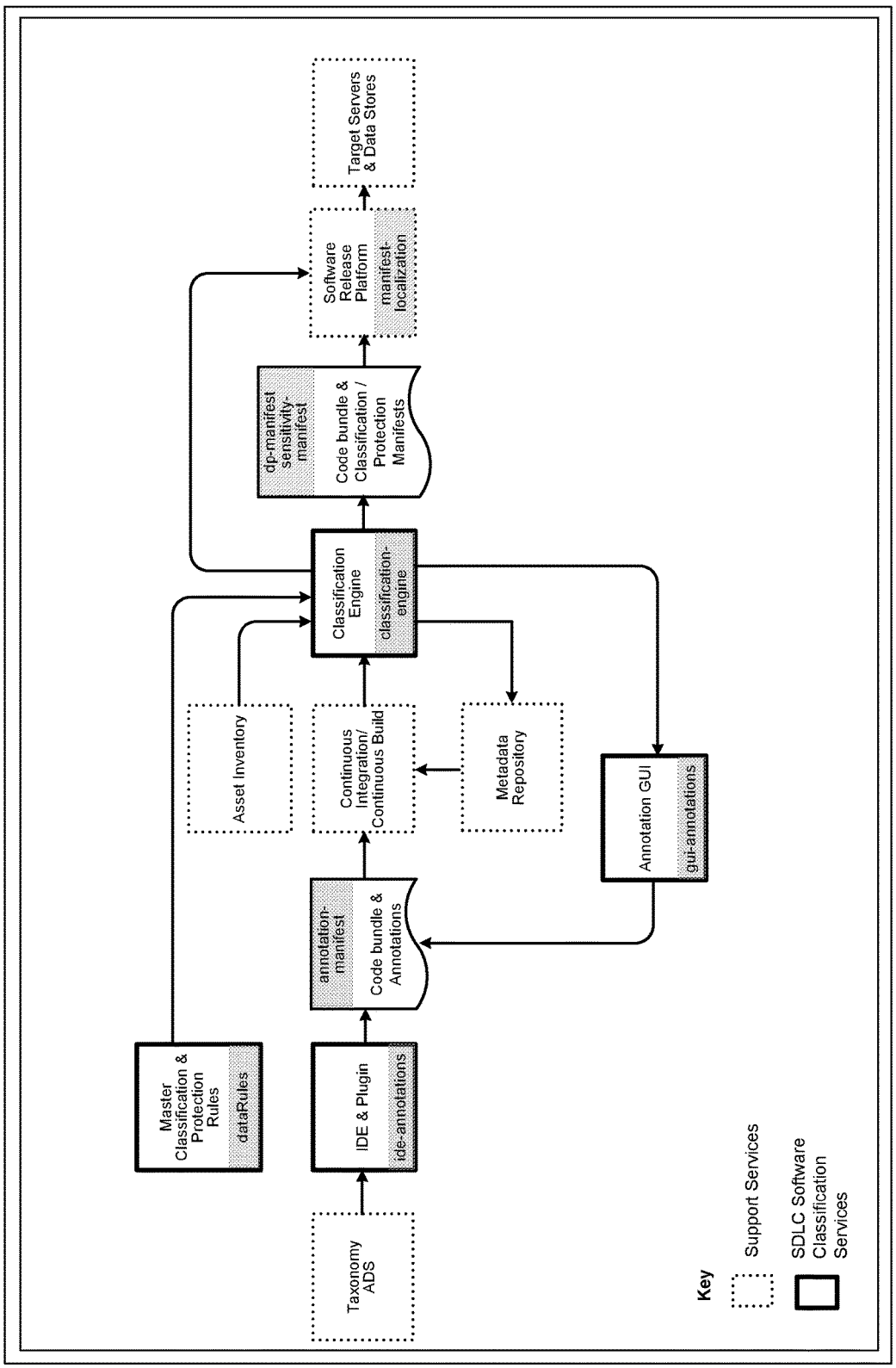
FIG. 5 depicts an exemplary approach for integrating data rules and classification into an automated system for use during software development is disclosed according to one embodiment.

Referring to FIG. 5, an exemplary approach for integrating data rules and classification into an automated system for use during software development is disclosed according to one embodiment.

For example, in Stage 1, as a software developer works in their Interactive Development Environment (IDE), plugins continually scan for software code indicative of the creation of new data structures. When these data structures are found, the software will permit the developer to annotate the structures, describing the data content in terms of subject, organization, jurisdiction and logical elements.

The code artifacts committed back to continuous integration/build may include both the software under development and metadata describing the data the software works with, either inline in the code, or as separate annotation manifests.

These annotations may be expressed with taxonomies consistent with the data rules authored in step 210, above.

In Stage 2, Continuous Integration and Build (CI/CB) takes all new code committed and tries to package and execute a new releasable piece of software. Where new data is discovered, the CI/CB pipeline may check whether that data is described within the corporate metadata repository, or within included annotations from Stage 1.

The CI/CB pipeline may also enrich this information with information about the assets the software will be deployed to, and automated matches based on previously described data, and rules authored in, for example, step 210. This may increase the automated provision of metadata and may reduce the level of annotation required by the developer in the IDE.

In Stage 3, when new data is discovered and described during CI/CB, the classification engine may consult the datarules and determine which data classifications are currently relevant, based on the policy sets defined in, for example, step 210 for this particular application and set of assets.

If new data is discovered that is not annotated or present in the metadata repository, the classification stage may break the build with an error until such time as annotations are supplied, the metadata repository is updated, or the developer describes the data via a separate annotation specific graphical user interface outside the IDE.

In Stage 4, a releasable artifact may be generated including the software itself, a metadata manifest describing the discovered data, a classification manifest providing the control classifications and policy versions used to determine them, and a control manifest describing the resulting all the possible access control, transmission and storage rules, retention requirements and control technologies required under the data rules.

These manifests permit the developer to determine any new control requirements they must meet during development, and to understand fully which data and policies drive those requirements.

In Stage 5, during software release, the control manifest may narrow the set of possible controls required to those necessary for the specific target servers and environments the app is being deployed to, resulting in a final control posture determination for the application, with an additional updated control manifest.

Although several embodiments are disclosed herein, it should be recognized that they are not exclusive, and elements of one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, secure enclaves on a chip (e.g., Intel SGX/AMD SEP), or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing data protection, comprising:
in an information processing apparatus comprising at least one computer processor:
    receiving a plurality of data classification rules for classifying data;
    receiving end user data classification of the data from end user software;
    receiving a developer description of the data during a software development lifecycle (SDLC)
    receiving developer data classification of the data from SDLC software, wherein the developer data classification is based on the developer description;
    generating a data inventory; and
    applying at least one data protection to the data inventory based on the data classification rules, the end user data classification, and the SDLC software data classification.

2. The method of claim 1, wherein the data classification rules are based on at least one of a data use environment, a security context for the data, a subject for the data, and an organizational jurisdiction for the data.

3. The method of claim 1, wherein the data classification rules are standardized into a single set of classifications.

4. The method of claim 1, wherein the data classification rules are stored in a rules store.

5. The method of claim 1, wherein the rules to detect an in-scope document are based on one of a data pattern in the document, an attribute of an author of the document, a source of the data, and a creation environment for the document.

6. The method of claim 1, further comprising specifying a data lookup criteria, wherein the data lookup criteria specifies a data match to a logical attribute or data subject based on at least one of a data pattern and a data value.

7. The method of claim 1, further comprising:
    receiving a data description from a developer for the data, wherein the data description describes the data using at least one stable term.

8. The method of claim 1, wherein the end user software automatically classifies unstructured data.

9. The method of claim 8, wherein the end user software automatically classifies unstructured data based on a prior classification.

10. The method of claim 8, further comprising:
    confirming the end user software automatic classification.

11. The method of claim 1, wherein the developer data classification comprises a developer classification and a datastore discovery classification.

12. The method of claim 1, wherein the SDLC classification comprises an end user classification and a filestore discovery classification.

13. The method of claim 1, wherein the data inventory comprises the end user classification and the SDLC classification for the data.

14. The method of claim 1, wherein the data inventory comprises a protection state for the data.

15. The method of claim 1, wherein the data inventory comprises a compliance state for the data.

16. The method of claim 1, wherein the data protection that is applied is a data protection level selected from the group consisting of baseline protection, enhanced protection, and full lifecycle data protection.

17. The method of claim 1, wherein an encryption level is associated with each data protection level.

18. The method of claim 1, further comprising defining a plurality of rules to detect an in-scope document.

19. The method of claim 1, wherein the data protection specifies at least one of who can access the data, where the data may be stored, transmitted, or transacted, a maximum and minimum data retention period, and technical controls placed on the data.

* * * * *